United States Patent
Edwards et al.

(10) Patent No.: US 10,929,846 B2
(45) Date of Patent: Feb. 23, 2021

(54) SECURE AUTOMATED TELLER MACHINES

(71) Applicant: Capital One Services, LLC, McLean, VA (US)

(72) Inventors: Joshua Edwards, Philadelphia, PA (US); Abdelkader M'Hamed Benkreira, New York, NY (US); Michael Mossoba, Arlington, VA (US); Rajko Ilincic, Annandale, VA (US)

(73) Assignee: Capital One Services, LLC, McLean, VA (US)

( * ) Notice: Subject to any disclaimer, the term of this patent is extended or adjusted under 35 U.S.C. 154(b) by 1 day.

(21) Appl. No.: 16/361,787

(22) Filed: Mar. 22, 2019

(65) Prior Publication Data

US 2020/0302755 A1 Sep. 24, 2020

(51) Int. Cl.
| | | |
|---|---|---|
| *G06Q 20/40* | (2012.01) | |
| *G07F 19/00* | (2006.01) | |
| *G06K 9/82* | (2006.01) | |
| *G06Q 20/10* | (2012.01) | |

(52) U.S. Cl.
CPC .......... *G06Q 20/4012* (2013.01); *G06K 9/82* (2013.01); *G06Q 20/1085* (2013.01); *G06Q 20/4016* (2013.01); *G07F 19/207* (2013.01); *G06Q 2220/00* (2013.01)

(58) Field of Classification Search
None
See application file for complete search history.

(56) References Cited

U.S. PATENT DOCUMENTS

| | | | |
|---|---|---|---|
| 5,151,582 A | 9/1992 | Fujioka | |
| 6,854,642 B2 | 2/2005 | Metcalf et al. | |
| 7,481,360 B1* | 1/2009 | Ramachandran | G06Q 20/18 235/379 |
| 7,946,477 B1* | 5/2011 | Ramachandran | G06K 7/0004 235/379 |
| 9,946,865 B2* | 4/2018 | Krawczyk | G06F 21/34 |
| 10,275,827 B2* | 4/2019 | McCarthy | G06Q 40/02 |
| 2002/0152169 A1* | 10/2002 | Dutta | G06Q 20/04 705/45 |
| 2004/0024709 A1* | 2/2004 | Yu | G06Q 20/105 705/43 |

(Continued)

FOREIGN PATENT DOCUMENTS

WO   WO-2017070638 A1 *  4/2017   ......... G03H 1/0011

OTHER PUBLICATIONS

Garcia-swartz, et al.; The Move Toward a Cashless Society: A Closer Look at Payment Instrument Economics. vol. 5, Issue 1, Jun. 2006 (Year: 2006).*

*Primary Examiner* — El Mehdi Oussir
(74) *Attorney, Agent, or Firm* — DLA Piper LLP (US)

(57) ABSTRACT

A method for improved security at automated teller machines (ATMs) comprising: capturing, by a first camera at an ATM, one or more images of a bank card; reading card information from the bank card by processing the one or more images of the bank card, wherein the card information comprises an account number and an expiration date; receiving, from an input device at the ATM, a personal identification number (PIN) entered by a user; sending a request to a server device to verify the card information and the PIN; and in response receiving a response from the server device, allowing the user to transact with the ATM.

9 Claims, 8 Drawing Sheets

(56) References Cited

U.S. PATENT DOCUMENTS

| | | | | |
|---|---|---|---|---|
| 2006/0131389 A1* | 6/2006 | Kwon | G07D 7/004 | |
| | | | 235/380 | |
| 2008/0269947 A1* | 10/2008 | Beane | G06Q 30/0607 | |
| | | | 700/237 | |
| 2012/0072274 A1* | 3/2012 | King | G06Q 30/0214 | |
| | | | 705/14.16 | |
| 2014/0037184 A1* | 2/2014 | Gorski | G06K 9/78 | |
| | | | 382/138 | |
| 2014/0244514 A1* | 8/2014 | Rodriguez | G06Q 20/10 | |
| | | | 705/71 | |
| 2015/0003667 A1* | 1/2015 | Rowley | G06K 9/18 | |
| | | | 382/100 | |
| 2018/0089755 A1* | 3/2018 | Mendez | G06Q 40/02 | |

\* cited by examiner

SECURE AUTOMATED TELLER MACHINES

BACKGROUND

Automated Teller Machines (ATMs) may include security features intended to protect banks and their customers (or "users") against theft, fraud, and other scams. For example, in addition to requiring a user to insert or swipe a bank card, ATMs typically require the user to enter a Personal Identification Number (PIN) associated with the bank card. Many ATMs are also equipped with surveillance cameras to record images or video of persons at or nearby the ATM.

Scammers have become increasingly sophisticated in their attempts to steal personal and financial information from ATM users. A well-known tactic is to modify an ATM's magnetic card reader with a so-called "skimming device." Skimming devices are capable of reading and capturing information encoded on an ATM user's bank card. This information can include the user's name, card number, and card expiration date. Skimming devices have been designed to fit discretely within, or on top of, existing magnetic card readers, making it difficult for users to determine if an ATM has been compromised. Scammers have also devised ways of surreptitiously capturing PINs from ATM users, for example by attaching a camera on or near the ATM to capture images of a user entering a PIN.

SUMMARY

According to one aspect of the present disclosure, a method for improved security at automated teller machines (ATMs) can include: capturing, by a first camera at an ATM, one or more images of a bank card; reading card information from the bank card by processing the one or more images of the bank card, wherein the card information comprises an account number and an expiration date; receiving, from an input device at the ATM, a personal identification number (PIN) entered by a user; sending a request to a server device to verify the card information and the PIN; and in response receiving a response from the server device, allowing the user to transact with the ATM.

In some embodiments, the one or more images of the bank card comprise one or more images of a first side of the bank card, and the method may include: capturing, by the first camera at the ATM, one or more images of a second side of the bank card; and reading a security code from the second side of the bank card by processing the one or more images of the second side of the bank card. Sending the request to the server device to verify the card information and the PIN can include sending a request to a server device to verify the card information, the PIN, and the security code. In some embodiments, the method may include displaying, on a display device of the ATM, instructions for the user to hold the bank card in view of the first camera. In some embodiments, displaying instructions for the user to hold the bank card in view of the first camera can include: displaying a first instruction to hold a first side of the bank card in view of the first camera; and displaying a second instruction to hold a second side of the bank card in view of the first camera.

In some embodiments, reading card information from the bank card can include applying optical character recognition (OCR) to the one or more images of the bank card. In some embodiments, the method can include: capturing, by a second camera at an ATM, one or more images of the user; and storing the one or more images of the user to a storage device attached to the ATM. In some embodiments, sending the request to a server device can include sending a request to a server device within a bank computer network. In some embodiments, the PIN may be provided as a one-time PIN. In some embodiments, reading card information from the bank card by processing the one or more images of the bank card can include verifying the bank card is valid by comparing the one or more images of the bank card to images of known valid bank cards issued by one or more card providers.

According to another aspect of the present disclosure, a method for improved security at automated teller machines (ATMs) can include: capturing, by a first camera at an ATM, one or more images of a bank card; receiving, from an input device at the ATM, a personal identification number (PIN) entered by a user; sending a request to a server device to verify the bank card, the request comprising the PIN and at least one of the one or more images of the bank card. The server device can be configured to: determine card information associated with the bank card by processing the one or more images of the bank card, wherein the card information comprises an account number and an expiration date; verify the bank card using the card information and the PIN; and in response receiving a response from the server device, allowing the user to access the ATM.

In some embodiments, the one or more images of the bank card comprise one or more images of a first side of the bank card, and the method can include capturing, by the first camera at the ATM, one or more images of a second side of the bank card. The request to verify the bank card comprises at least one of the one or more images of the second of the bank card. In some embodiments, the method can include displaying, on a display device of the ATM, instructions for the user to hold the bank card in view of the first camera. In some embodiments, displaying instructions for the user to hold the bank card in view of the first camera can include: displaying a first instruction to hold a first side of the bank card in view of the first camera; and displaying a second instruction to hold a second side of the bank card in view of the first camera.

In some embodiments, the server device may be configured to determine the card information associated with the bank card by applying optical character recognition (OCR) to the one or more images of the bank card. In some embodiments, the method can include: capturing, by a second camera at an ATM, images of the user; and storing the images of the user to a storage device attached to the ATM. In some embodiments, sending the request to the server device comprises sending a request to a server device within a bank computer network. In some embodiments, the PIN can be provided as a one-time PIN. In some embodiments, the method can include verifying the bank card is valid by comparing the one or more images of the bank card to images of known valid bank cards issued by one or more card providers.

According to another aspect of the present disclosure, a secure automated teller machine (ATM) can include: a first camera; a display device; an input device; a processor; and a non-volatile memory. The non-volatile memory can store instructions that when executed on the processor cause the processor to: display, on the display device, instructions for the user to hold the bank card in view of the first camera; capture, by the first camera, one or more images of a bank card; read card information from the bank card by processing the one or more images of the bank card, wherein the card information comprises an account number and an expiration date; receive, from the input device, a personal identification number (PIN) entered by a user; send a request to a server device to verify the card information and the PIN;

and in response to receiving a response from the server device, allow the user to transact with the ATM.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

The present disclosure relates to systems and methods for improving the security of ATMs and bank computer networks. In some embodiments, an ATM can be configured to read bank cards using cameras and computer vision (CV) technology instead of using a magnetic card reader. By eliminating the use of a magnetic card reader, scammers will not have a place to attach a skimming device, making it more difficult to steal users' personal and financial information. In some embodiments, a camera can be affixed to, or nearby, the ATM and configured to capture images or video of a user's bank card when the card is held up to the ATM. The ATM can read information from the card information by applying optical character recognition (OCR) or other CV techniques to the captured images. In some embodiments, the ATM can read information from both a front side and a back side of a bank card. For example, as an additional security measure, the ATM may read and use the card verification value (CVV), which is typically located on the back side of a bank card.

Figure 1:
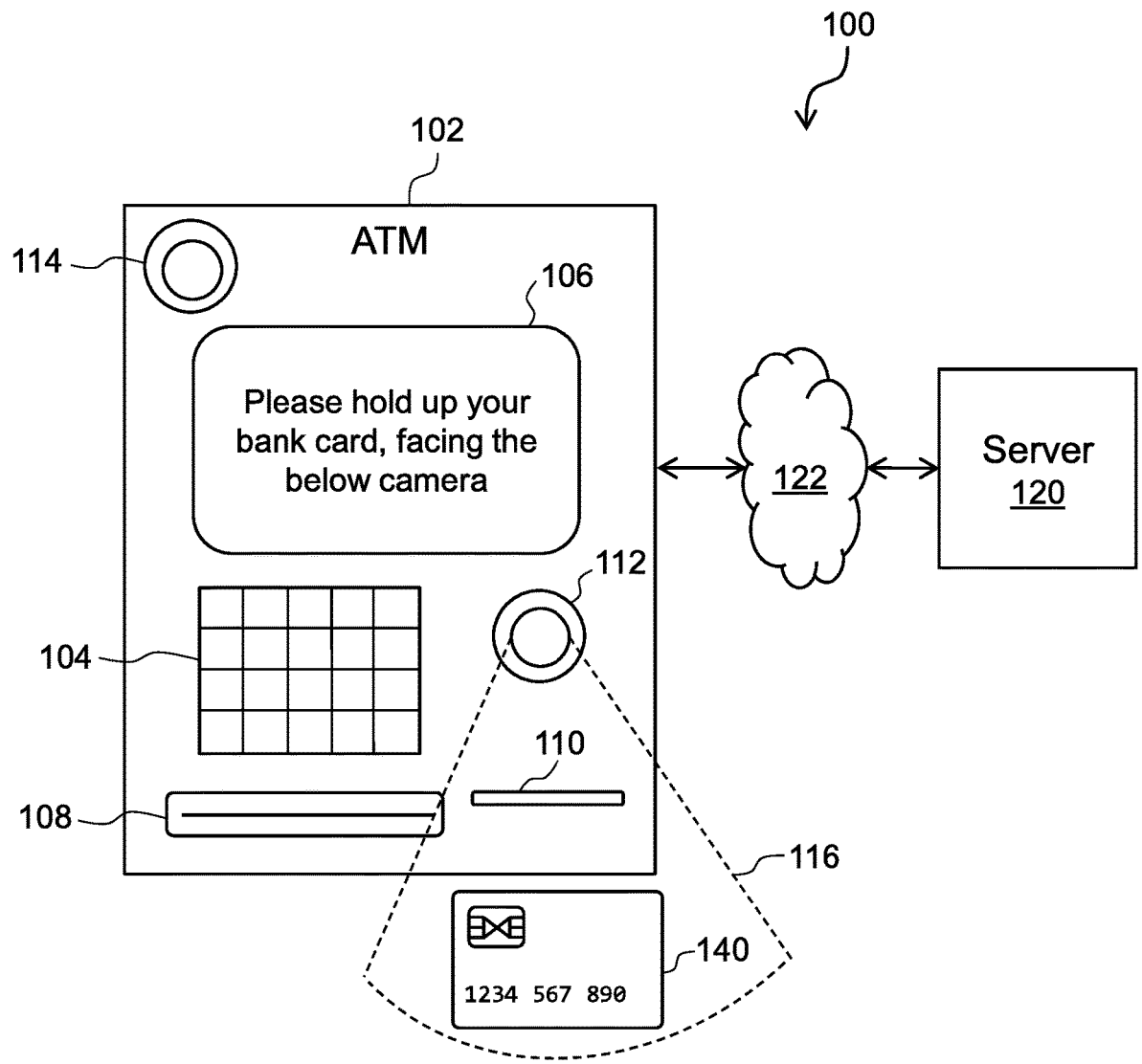
FIG. 1 is a diagram of a system for improved ATM security using optical character recognition (OCR) to read bank cards, according to some embodiments of the present disclosure.

FIG. 1 shows a system for improved security of ATMs and bank computer networks using optical character recognition (OCR) to read bank cards, according to some embodiments of the present disclosure. The illustrative system 100 includes an ATM 102 communicably coupled to a server 120 via a network 122. In some embodiments, the system 100 can include a plurality of ATMs each connected to the same server 120 or collection of servers. In some embodiments, server 120 may be hosted by a financial institution (e.g., CAPITAL ONE™) that provides the disclosed functionality to its customers. Server 120 may be one of many interconnected physical and/or virtual server devices that form a bank computer network. Network 122 may correspond to a wired or wireless communications network, or a collection of such networks. In some embodiments, network 122 may correspond, at least in part, to a physical or virtual private network operated by a financial institution.

ATM 102 can include an input device 104, a display device 106, a cash-dispensing device 108, a receipt printer 110, a first camera 112, and a second camera 114, according to some embodiments. ATM 102 may also include a wired or wireless network adapter (not shown) configured to communicate with server 120 via network 122. In some embodiments, input device 104 and display device 106 may collectively be provided as a touchscreen device. In some embodiments, input device 104 may be provided as a numeric or alphanumeric keypad. The cash-dispensing mechanism ("cash dispenser") 108 may be configured to dispense selected quantities of paper currency. In some embodiments, cash dispenser 108 and receipt printer 110 may be provided by a single hardware device or mechanism.

In some embodiments, second camera 114 may be a surveillance camera configured to capture images or video of the ATM and its surroundings, including faces of persons using the ATM or located near the ATM. First camera 112 may be configured to capture images of bank cards that users hold up or otherwise display to the ATM 102. In some embodiments, an ATM 102 may have a single camera that can be used for both surveillance and reading bank cards. For example, an ATM's existing surveillance camera can be adapted to read bank cards in a manner set forth in the present disclosure. In some embodiments, ATM 102 may include a storage device (not shown) to store images/video captured by cameras 112, 114. In some embodiments, ATM 102 may transmit camera images/video to server 120 for storage. ATM 102 can include one or more processors (not shown) configured to perform the methods and techniques described hereinbelow.

When a user initiates a transaction with ATM 102, the ATM 102 may display instructions for the user on display device 106. As used herein, the term "transaction" can refer to a discrete ATM transaction (e.g., cash or check deposit, cash withdrawal, or balance inquiry) or a series of transactions associated with a particular user or bank account. As shown in FIG. 1, ATM 102 may instruct the user to hold up bank card 140 so that the front, or back, side of the card is facing the ATM and thus can be read by the first camera 112. In particular, the displayed instructions may guide the user to hold card 140 within the first camera's field-of-view 116 such that the first camera 112 can capture images/video of the card. In some embodiments, ATM 102 may provide additional instructions to the user. For example, if the user is holding the card in a manner where their fingers are occluding important parts of the card, ATM 102 may instruct the user to hold the card differently. In some embodiments, ATM 102 may include a speaker (not shown) and be configured to provide audible instructions.

ATM 102 can use OCR or another CV technique to extract (or "read") information off of the user's bank card. The read card information can include, for example, an account number, expiration date, and account holder name. In some embodiments, ATM 102 may display, on display device 106, instructions for the user to turn the bank card over so that the camera 112 can read information (e.g., the CVV) from the back of the card. In some embodiments, ATM 102 may instruct the user to hold up a bank card until the card information is successfully read, or for a predetermined amount of time (e.g., 5 seconds). Once the card information has been read, ATM 102 may prompt the user to enter a PIN via the input device 104. ATM 102 may transmit the PIN along with some (or all) of the card information to the server 120 for verification, e.g., the account number, expiration data, and the account holder name. Server 120 may respond to ATM 102 with information indicating whether the user is permitted to proceed with the transaction.

In some embodiments, OCR can be performed at the server 120 instead of, or in addition to, at the ATM 102. For example, ATM 102 may transmit images/video captured of the bank card 140 to the server 120 which can, in turn, use OCR to determine the account number, expiration date, or other card information.

In some embodiments, CV can be used to detect a real versus counterfeit bank cards to further improve ATM security. For example, the ATM 102 or server 120 can attempt to recognize images, logos, icons, colors, fonts, sizing, spacing, watermarks, or other indicators on the card and compare them with images of valid bank cards issued by various card providers. In some embodiments, CV could be used to find indicators of physical wear on the card consistent with the card having been entered into chip readers and/or swiped using the magnetic stripe. If the card has visual characteristics that are inconsistent with a valid card and/or does not have an expected amount of physical wear, the ATM 102 or server 120 can prevent the user from transacting with the ATM. In some embodiments, system 100 may determine if a card's physical wear signs are consistent with the purchase history of the card using, for example, the number of "card present" transactions associated with the card since it was issued. A "card present" transaction may refer to a transaction where the card was physically presented (e.g., swiped, tapped, or dipped).

Figure 2A:
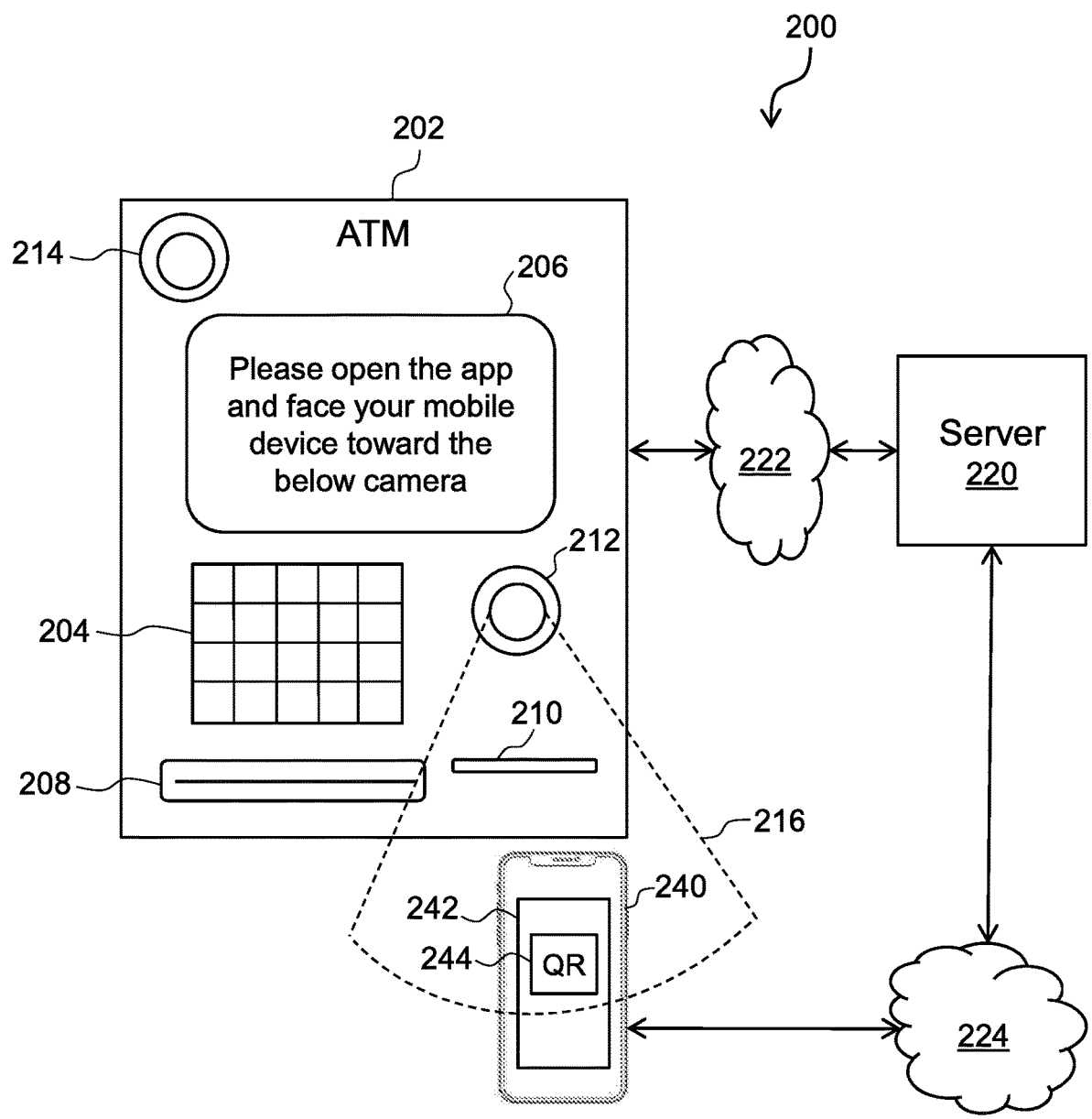
FIGS. 2A and 2B are diagrams of a system for improved ATM security using device-based authentication, according to some embodiments of the present disclosure.
Figure 2B:
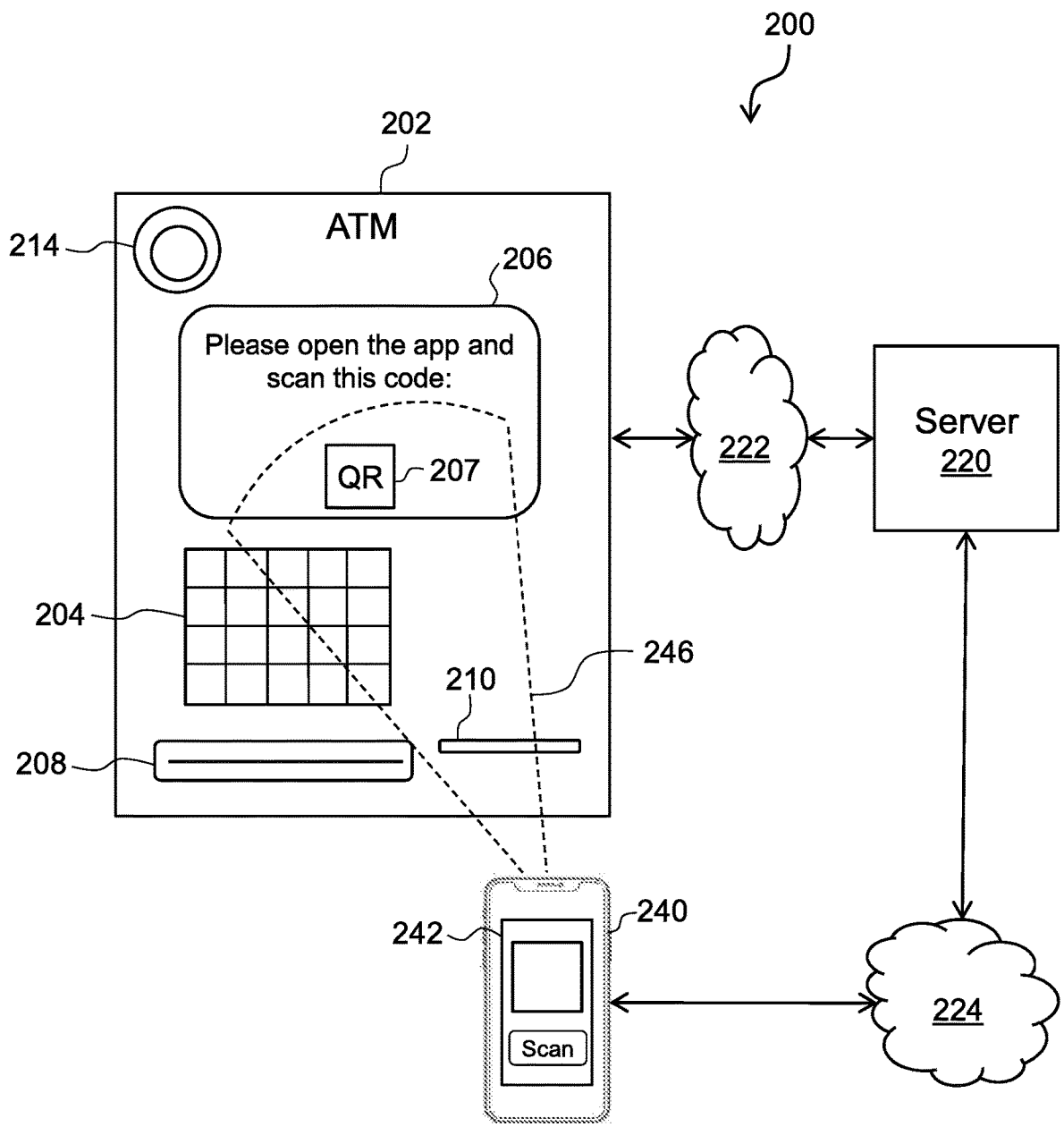

FIGS. 2A and 2B show a system for improved security of ATMs and bank computer networks using device-based authentication, according to some embodiments of the present disclosure. The illustrative system 200 can include an ATM 202 communicably coupled to a server 220 via a first network 222, and one or more user devices 240 communicably coupled to the server 220 via a second network 224. User devices 240 can include, for example, smartphones, tablets, and other mobile devices. The first and second networks 222, 224 may include wireless or wired communications networks. In some embodiments, first network 222 may correspond, at least in part, to a private computer network operated by a financial institution. In some embodiments, second network 224 may correspond, at least in part, to a public Wi-Fi or cellular network.

ATM 202 may be the same as or similar—e.g., in terms of hardware or software components—to ATM 102 described above in the context of FIG. 1. For example, ATM 202 can include an input device 204, a display device 206, a cash-dispensing device 208, a receipt printer 210, a first camera 212, and a second camera 214. ATM 202 can include one or more processors (not shown) configured to perform the methods and techniques described hereinbelow.

As shown in FIG. 2A, according to some embodiments of the present disclosure, a user can authenticate with the ATM 202 using an application ("app") 242 installed on device 240. Prior to using the ATM 202, the user may be required to link the user's device 240 to a bank account. For example, app 242 may require the user to enter a username and password associated with the user's bank account. When the user initiates a transaction, ATM 202 can display instructions to the user (e.g., via display device 206) to open the app 242 on device 240. App 242 may be configured to generate and display a secure code 244. ATM 202 may be configured to use first camera 212 to capture images of the secure code displayed on the user device 240. In some embodiments, the secure code 244 can be a displayed as a matrix barcode, such as a Quick Response (QR) code. A skilled artisan will recognize that the secure code can be displayed on the device 240 (and read by ATM 202) using other graphical formats, including but not limited to "one-dimensional" barcode or text. For simplicity of explanation, the underlying value of the secure code and its graphical representation are both referred to herein as the "secure code 244." In some embodiments, secure code 244 may be generated by server 220 and transmitted to the user device 240 via network 224. In other embodiments, secure code 244 may be generated by user device 240 and transmitted to server 220.

ATM 202 may instruct the user to face the device's screen such that it is within a field-of-view 216 of the ATM's first camera 212, as shown in FIG. 2A. After the ATM reads the secure code 244, it can send the code to server 220 for verification. If the secure code 244 displayed by the user device 240 matches the code previously generated by (or sent to) server 220, then the ATM may permit the user to proceed with the transaction. In some embodiments, the server 220 can use the code to lookup the customer's data. In some embodiments, the secure code 244 can be time-sensitive and/or single-use. That way, even if a skimmer has a camera set up to read the QR code, the code would be rejected by the server 220 when the skimmer attempted to use it. The QR code-based authentication techniques described herein can be used in addition to a PIN or as an alternative to a PIN.

In addition to ATM authentication functionality described herein, app 242 may provide various other banking-related features, such as the ability to view the user's current balance and transaction history, a feature to deposit checks, an ATM locator feature, and a customer support feature. In some embodiments, app 242 may require that the user authenticate themselves to the user device 240 before the app 242 authenticates the user with the ATM 202. For example, the user may be required to enter a passcode or pass a biometric check, such as a thumbprint or facial comparison.

FIG. 2B shows another method for authenticating with the ATM 202 using an app 242 installed on device 240, according to some embodiments of the present disclosure. Similar to the method illustrated in FIG. 2A and described above, a secure code may be used to establish trust between the user and the ATM 202. Here, the ATM 202 may display a graphical representation of the secure code 207 (e.g., as a QR code), and the user device 240 can read the code using its camera. The app 242 may instruct the user to point the user device's camera at the ATM's display device 206 such that the secure code 207 is within the device's camera field-of-view 246, as shown in FIG. 2B. After the app 242 reads the secure code 207, it can send the code to server 220. In some embodiments, ATM 202 can periodically check with (or "poll") server 202 to determine if the secure code has been received from a user device and, thus, if the user is authorized to transact with the ATM. Prior to this process, the user may be required to register their device 240 with their account on the server 220, in addition to passing one or more authentication checks within the app 240, such as a biometric check or a PIN entry.

In some embodiments, ATM 202 can authenticate using one-time (or "single-use") PINs. For example, when a user initiates an ATM transaction (e.g., by holding up a bank card so it can be read using OCR), ATM 202 may cause a one-time PIN to be sent to the user's device 240 as an email, text message, or app notification. The one-time PIN may be generated and verified by the server 220 in communication with both the ATM and the user device.

In some embodiments, ATM 202 may use multi-factor authentication. For example, a user may be required to enter a PIN and also present a secure QR code to the ATM before they are allowed to transact.

The system 200 can provide improved security for banks and their customers through the use of device-based authentication, one-time PINs, and/or multi-factor authentication. Moreover, these authentication methods can be combined with OCR-based card reading, as described above in the context of FIG. 1, to further improve security within existing computer networks.

Figure 3:
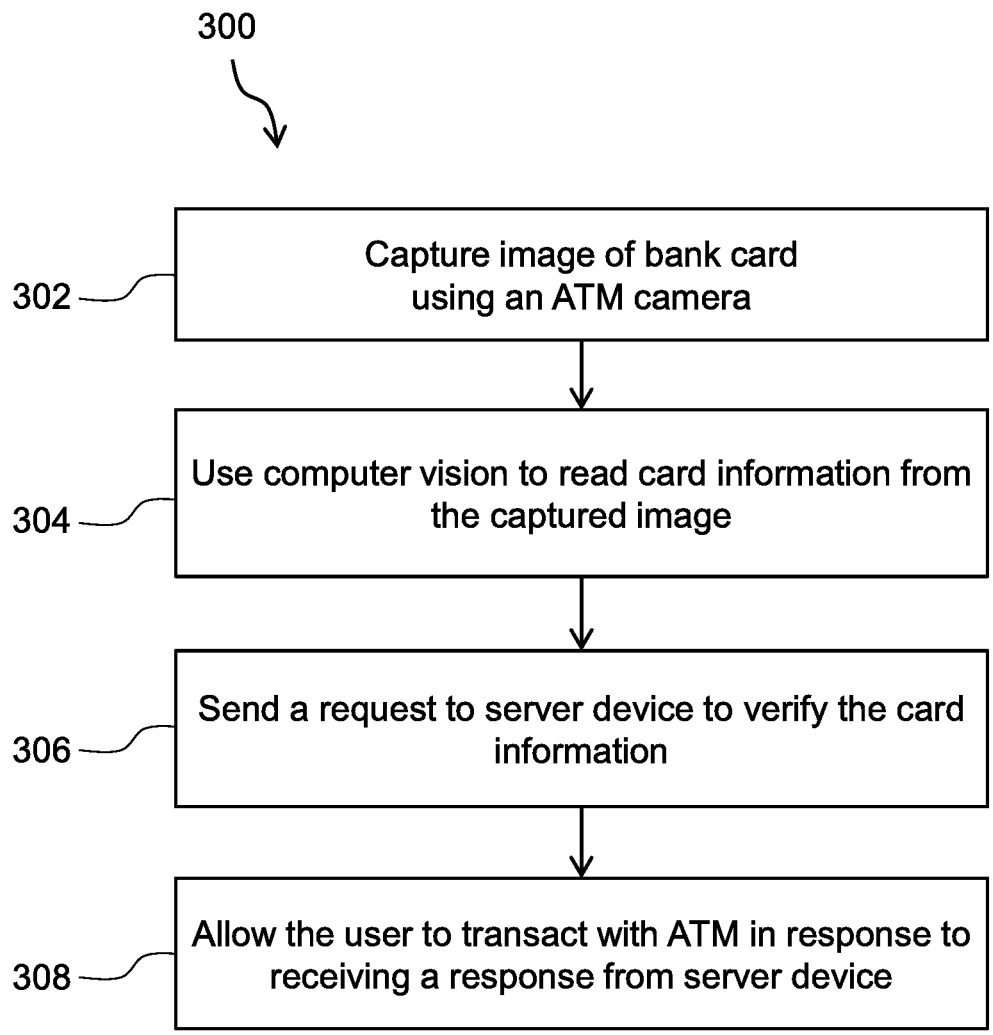
FIGS. 3, 4A, and 4B are flow diagrams showing processing that may occur within the systems of FIG. 1, 2A, or 2B, according to some embodiments of the present disclosure.

FIG. 3 is a flow diagram showing processing that may occur within the system of FIGS. 1, 2A, and/or 2B, according to some embodiments of the present disclosure. In some embodiments, a method 300 may be implemented within an ATM, such as ATM 102 in FIG. 1. Method 300 can allow a user to access an ATM without having to swipe or insert a bank card into a magnetic card reader.

At block 302, images and/or video of the user's bank card may be captured. The images/video may be captured by a camera attached to or positioned nearby the ATM. In some embodiments, the ATM may display instructions for the user to hold a bank card up in view of the camera. In some embodiments, the ATM may capture images/video of both the front side and back side of the bank card. In some embodiments, the captured images/video may be stored within the ATM or transmitted to a remote server for storage.

At block 304, computer vision (e.g., OCR) may be used to read card information from the captured images/video. In some embodiments, the card information can include an account number, expiration date, account holder name, and/or CVV.

At block 306, some or all of the card information may be transmitted to a server device (e.g., server 120 in FIG. 1) for verification. For example, a request including the account number, expiration date, account holder name, and/or CVV may be sent to a server device (e.g., a server device within a bank computer network). In some embodiments, the user may enter a PIN using an input device on the ATM, and the PIN may also be sent to the server for verification.

The server can send a response back to the ATM indicating whether the user is authorized to use the ATM. If the response indicates that the user is authorized, the ATM may allow the user to continue with the transaction at block 308.

Figure 4A:
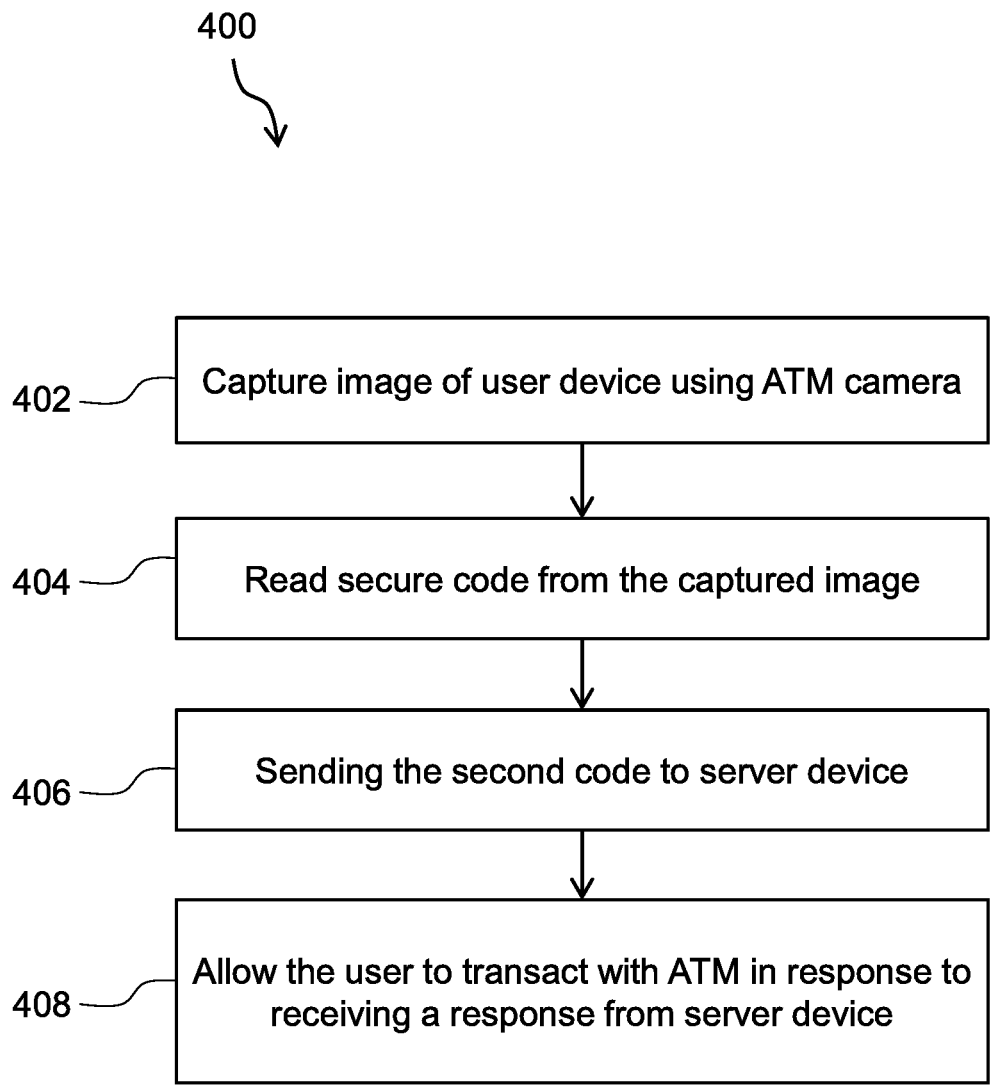

FIG. 4A is a flow diagram showing processing that may occur within the system of FIG. 1, 2A, or 2B, according to some embodiments of the present disclosure. In some embodiments, a method 400 may be implemented within an ATM, such as ATM 202 in FIG. 2. Method 400 can allow a user to authenticate with an ATM using a smartphone, tablet, or other type of mobile device.

At block 402, images and/or video of the user's device are captured. The images/video may be captured by a camera attached to or positioned nearby the ATM. In some embodiments, prior to step 402, the ATM may display instructions for the user to open a particular app on the device and to orient the device such that the screen is visible to the ATM camera. In some embodiments, the app is a banking app that the user can download and install on the user's device. The app may be configured to generate and display a secure code, such as a QR code. In some embodiments, the secure code may be generated by a server device and transmitted to the user device via a computer network. In other embodiments, the secure code may be generated locally at the user device and then transmitted to the server device.

At block 404, the secure code can be read from the captured images/video using a suitable technique, such as a technique for decoding QR codes. At block 406, the ATM can send the secure code to the server device for verification. The server device can compare the secure code received from the ATM against a secure code previously generated by the server device or sent to the server device by the user's device.

The server can send a response back to the ATM indicating whether the user is authorized to use the ATM. If the response indicates that the user is authorized, the ATM may allow the user to continue with the transaction at block 408.

Figure 4B:
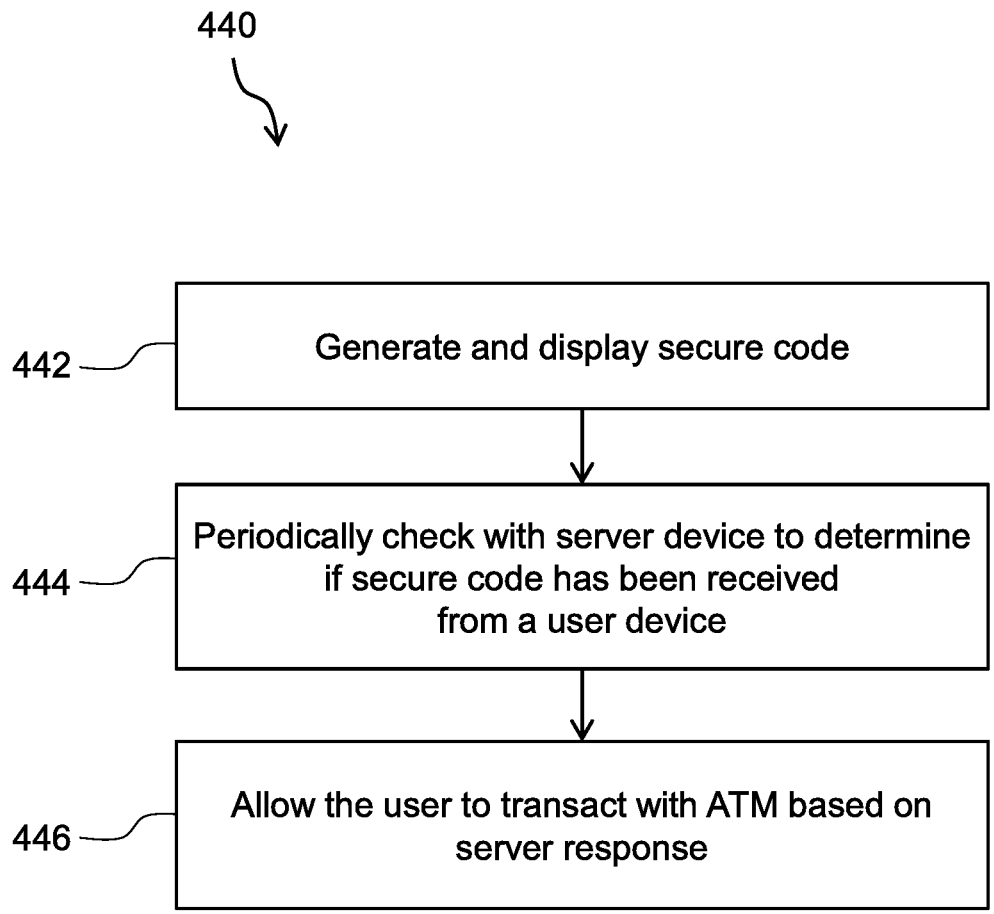

FIG. 4B is a flow diagram showing processing that may occur within the system of FIG. 1, 2A, or 2B, according to some embodiments of the present disclosure. In some embodiments, a method 440 may be implemented within an ATM, such as ATM 202 in FIG. 2. Method 440 can allow a user to authenticate with an ATM using a smartphone, tablet, or other type of mobile device.

At block 442, a secure code can be generated, and displayed on display device at an ATM. In some embodiments, the secure code may be generated by a server device and transmitted to the ATM via a network. In some embodiments, the ATM may display instructions for the user to open a particular app on the device and point the user device's camera at the ATM to capture the displayed secure code. The app may be configured to read the code, for example in QR format. The app installed on the user's device may be configured to send the secure code to the server device. The server device can determine if the secure code received from the user device matches a secure code previously generated by the server device.

At block 444, the ATM can periodically check with the server device to determine if the secure code has been received from the user device. For example, the ATM may poll the server at a predetermined interval (e.g., every second). The server can send a response back to the ATM indicating whether a user is authorized to use the ATM. The server can determine which bank account (if any) is linked to the user device and include corresponding account information in the response to the ATM. If the response indicates that the user is authorized, the ATM may allow the user to continue with the transaction at block 446.

Figure 5:
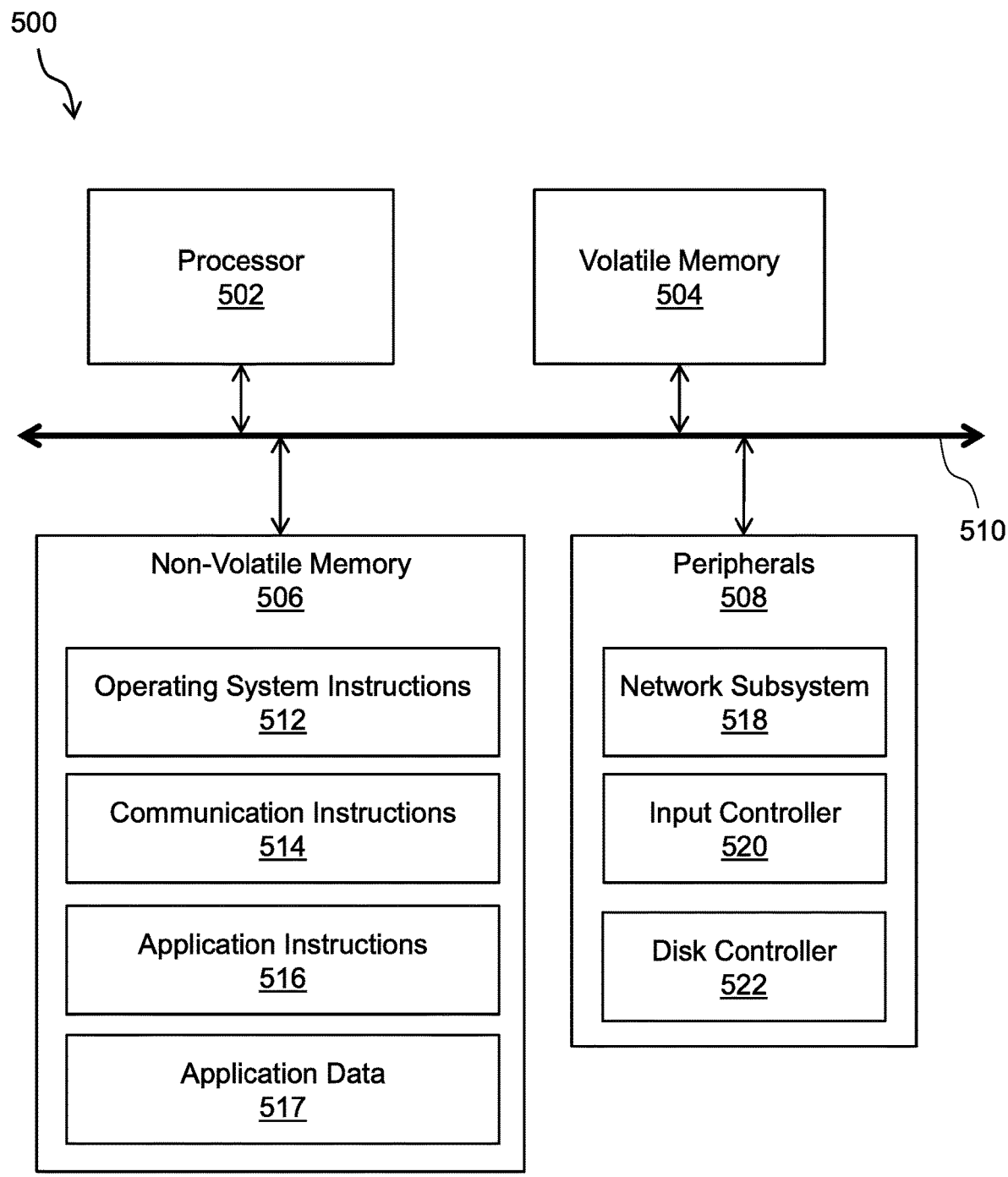
FIG. 5 is a block diagram of a computing device that may form part of an ATM or a server device, according to some embodiments of the present disclosure.

FIG. 5 shows an illustrative computing device 500 that may implement various features and processes as described herein. In some embodiments, computing device 500 may form part of an ATM, such as ATM 102 of FIG. 1 or ATM 202 in FIGS. 2 and 2B. In some embodiments, computing device 500 may form part of a server device, such as server device 120 in FIG. 1 or server device 220 in FIGS. 2A and 2B. The device 500 may be implemented on any electronic device that runs software applications derived from compiled instructions, including without limitation personal computers, servers, smart phones, media players, electronic tablets, game consoles, email devices, etc. In some implementations, the device 500 may include one or more processors 502, volatile memory 504, non-volatile memory 506, and one or more peripherals 508. These components may be interconnected by one or more computer buses 510.

Processor(s) 502 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Bus 510 may be any known internal or external bus technology, including but not limited to ISA, EISA, PCI, PCI Express, NuBus, USB, Serial ATA or FireWire. Volatile memory 504 may include, for example, SDRAM. Processor 502 may receive instructions and data from a read-only memory or a random access memory or both. The essential elements of a computer may include a processor for executing instructions and one or more memories for storing instructions and data.

Non-volatile memory 506 may include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 506 may store various computer instructions including operating system instructions 512, communication instructions 514, application instructions 516, and application data 517. Operating system instructions 512 may include instructions for implementing an operating system (e.g., Mac OS®, Windows®, or Linux). The operating system may be multi-user, multiprocessing, multitasking, multithreading, real-time, and the like. Communication instructions 514 may include network communications instructions, for example, software for implementing communication protocols, such as TCP/IP, HTTP, Ethernet, telephony, etc.

Peripherals 508 may be included within the device 500 or operatively coupled to communicate with the sever device 500. Peripherals 508 may include, for example, network interfaces 518, input devices 520, and storage devices 522. Network interfaces may include for example an Ethernet or WiFi adapter. Input devices 520 may be any known input device technology, including but not limited to a keyboard (including a virtual keyboard), mouse, track ball, and touch-sensitive pad or display. Storage devices 522 may include one or more mass storage devices for storing data files; such devices include magnetic disks, such as internal hard disks and removable disks; magneto-optical disks; and optical disks.

In some embodiments, peripherals 508 can include one or more ATM cameras, an ATM display device, an ATM input device, a cash dispenser, and/or a receipt printer. In some embodiments, application instructions 516 can include instructions to perform OCR or other CV techniques. In some embodiments, application data 517 can be configured to store images/video captured by ATM cameras.

Methods described herein may represent processing that occurs within, for example, system 100 of FIG. 1 or system 200 of FIG. 2. The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

Figure 6:
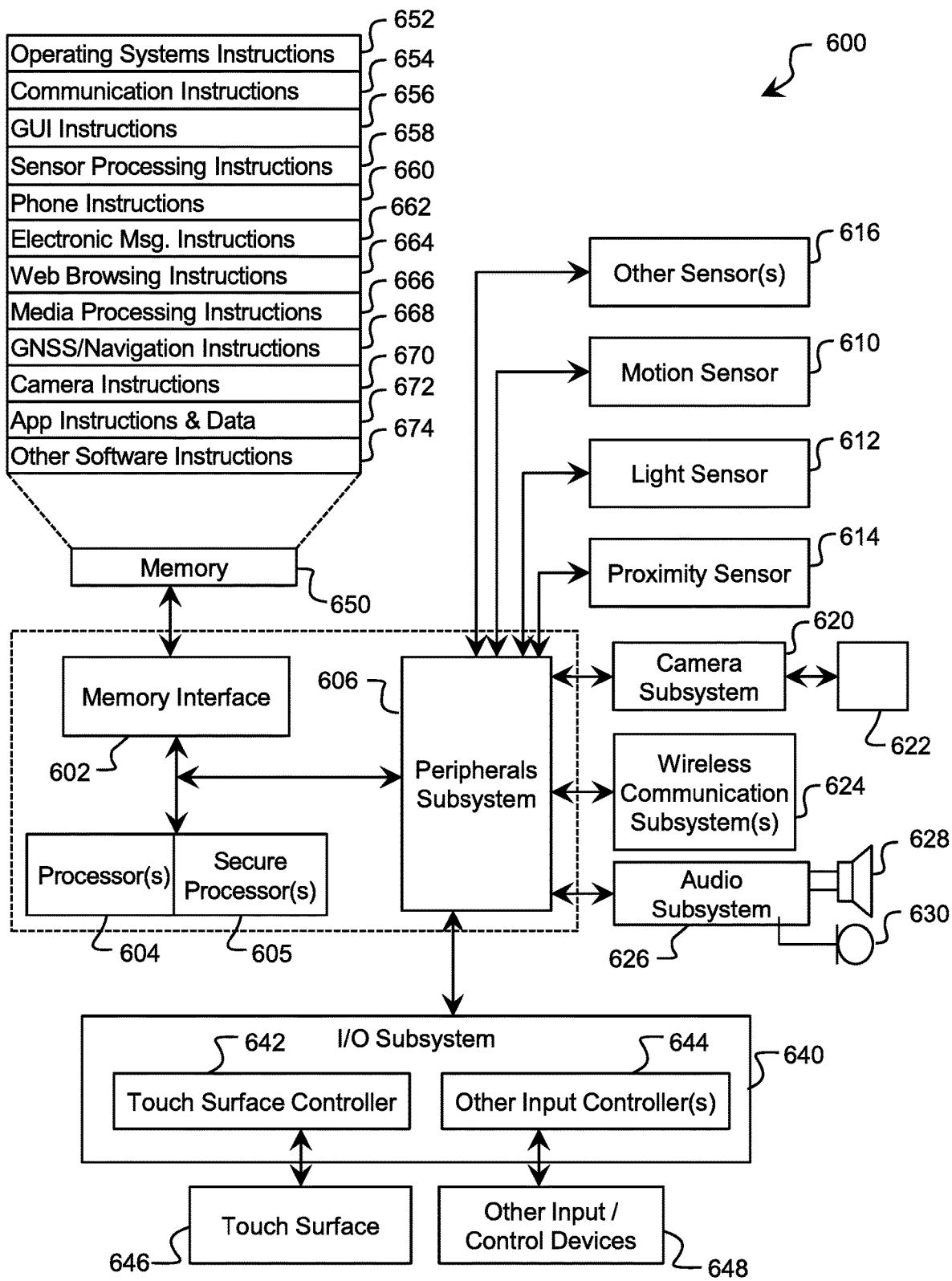
FIG. 6 is a block diagram of a user device, according to some embodiments of the present disclosure.

FIG. 6 shows a user device 600, according to an embodiment of the present disclosure. The illustrative user device 600 may include a memory interface 602, one or more data processors, image processors, central processing units 604, and/or secure processing units 605, and a peripherals interface 606. The memory interface 602, the one or more processors 604 and/or secure processors 605, and/or the peripherals interface 606 may be separate components or may be integrated into one or more integrated circuits. The various components in the user device 600 may be coupled by one or more communication buses or signal lines.

Sensors, devices, and subsystems may be coupled to the peripherals interface 606 to facilitate multiple functionalities. For example, a motion sensor 610, a light sensor 612, and a proximity sensor 614 may be coupled to the peripherals interface 606 to facilitate orientation, lighting, and proximity functions. Other sensors 616 may also be connected to the peripherals interface 606, such as a global navigation satellite system (GNSS) (e.g., GPS receiver), a temperature sensor, a biometric sensor, magnetometer, or other sensing device, to facilitate related functionalities.

A camera subsystem 620 and an optical sensor 622, e.g., a charged coupled device (CCD) or a complementary metal-oxide semiconductor (CMOS) optical sensor, may be utilized to facilitate camera functions, such as recording photographs and video clips. The camera subsystem 620 and the optical sensor 622.

Communication functions may be facilitated through one or more wired and/or wireless communication subsystems 624, which can include radio frequency receivers and transmitters and/or optical (e.g., infrared) receivers and transmitters. For example, the Bluetooth (e.g., Bluetooth low energy (BTLE)) and/or WiFi communications described herein may be handled by wireless communication subsystems 624. The specific design and implementation of the communication subsystems 624 may depend on the communication network(s) over which the user device 600 is intended to operate. For example, the user device 600 may include communication subsystems 624 designed to operate over a GSM network, a GPRS network, an EDGE network, a WiFi or WiMax network, and a Bluetooth™ network. For example, the wireless communication subsystems 624 may include hosting protocols such that the device 600 can be configured as a base station for other wireless devices and/or to provide a WiFi service.

An audio subsystem 626 may be coupled to a speaker 628 and a microphone 630 to facilitate voice-enabled functions, such as speaker recognition, voice replication, digital recording, and telephony functions. The audio subsystem 626 may be configured to facilitate processing voice commands, voiceprinting, and voice authentication, for example.

The I/O subsystem 640 may include a touch-surface controller 642 and/or other input controller(s) 644. The touch-surface controller 642 may be coupled to a touch surface 646. The touch surface 646 and touch-surface controller 642 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 646.

The other input controller(s) 644 may be coupled to other input/control devices 648, such as one or more buttons, rocker switches, thumb-wheel, infrared port, USB port, and/or a pointer device such as a stylus. The one or more buttons (not shown) may include an up/down button for volume control of the speaker 628 and/or the microphone 630.

In some implementations, a pressing of the button for a first duration may disengage a lock of the touch surface 646; and a pressing of the button for a second duration that is longer than the first duration may turn power to the user device 600 on or off. Pressing the button for a third duration may activate a voice control, or voice command, a module that enables the user to speak commands into the microphone 630 to cause the device to execute the spoken command. The user may customize a functionality of one or more of the buttons. The touch surface 646 can, for example, also be used to implement virtual or soft buttons and/or a keyboard.

In some implementations, the user device 600 may present recorded audio and/or video files, such as MP3, AAC, and MPEG files. In some implementations, the user device 600 may include the functionality of an MP3 player, such as an iPod™. The user device 600 may, therefore, include a 36-pin connector and/or 8-pin connector that is compatible with the iPod. Other input/output and control devices may also be used.

The memory interface 602 may be coupled to memory 650. The memory 650 may include high-speed random access memory and/or non-volatile memory, such as one or more magnetic disk storage devices, one or more optical storage devices, and/or flash memory (e.g., NAND, NOR). The memory 650 may store an operating system 652, such as Darwin, RTXC, LINUX, UNIX, OS X, WINDOWS, or an embedded operating system such as VxWorks.

The operating system 652 may include instructions for handling basic system services and for performing hardware dependent tasks. In some implementations, the operating system 652 may be a kernel (e.g., UNIX kernel). In some implementations, the operating system 652 may include instructions for performing voice authentication.

The memory 650 may also store communication instructions 654 to facilitate communicating with one or more additional devices, one or more computers and/or one or more servers. The memory 650 may include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GNSS/Navigation instructions 668 to facilitate GNSS and navigation-related processes and instructions; and/or camera instructions 670 to facilitate camera-related processes and functions.

Memory 650 may store various software instructions 672, 674, such as instructions for an app that can be used to authenticate with an ATM.

Each of the above identified instructions and applications may correspond to a set of instructions for performing one or more functions described herein. These instructions need not be implemented as separate software programs, procedures, or modules. The memory 650 may include additional instructions or fewer instructions. Furthermore, various functions of the user device 600 may be implemented in hardware and/or in software, including in one or more signal processing and/or application specific integrated circuits.

In some embodiments, processor 604 may perform processing including executing instructions stored in memory 650, and secure processor 605 may perform some processing in a secure environment that may be inaccessible to other components of user device 600. For example, secure processor 605 may include cryptographic algorithms on board, hardware encryption, and physical tamper proofing. Secure processor 605 may be manufactured in secure facilities. Secure processor 605 may encrypt data/challenges from external devices. Secure processor 605 may encrypt entire data packages that may be sent from user device 600 to the network. Secure processor 605 may separate a valid user/external device from a spoofed one, since a hacked or spoofed device may not have the private keys necessary to encrypt/decrypt, hash, or digitally sign data, as described herein.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, such as EPROM, EEPROM, flash memory device, or magnetic disks. The processor and the memory can be supplemented by, or incorporated in, special purpose logic circuitry.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A method for improved security at an automated teller machine (ATM), the method comprising:
   displaying, by the ATM on a display device of the ATM, instructions for a user to hold a bank card up to the ATM;
   capturing, by a first camera of the ATM, one or more images of the bank card held by the user, the one or more images comprising a first side of the bank card and a second side of the bank card;
   reading, by the ATM, card information from the bank card by processing the one or more images of the bank card, wherein the card information comprises an account number and an expiration date;
   receiving, by the ATM from an input device, a personal identification number (PIN) entered by the user;
   accessing, by the ATM a transaction history associated with the bank card;
   identifying, by the ATM, visible wear indicators on the first side of the bank card and the second side of the bank card based on the one or more images;
   comparing, by the ATM, the identified visible wear indicators to expected wear indicators based on the transaction history;
   confirming, by the ATM, that the bank card is not counterfeit by determining that the visible wear indicators are consistent with the expected wear indicators based on the comparison;
   based on the confirming, sending, by the ATM, a request to a server device to verify the card information and the PIN, the request comprising at least the account number, the expiration date, and the PIN; and
   in response receiving a response from the server device, conducting, by the ATM, a transaction with the user.

2. The method of claim 1, wherein confirming that the bank card is not counterfeit further comprises:
   reading a security code from the second side of the bank card.

3. The method of claim 1 wherein displaying, by the ATM, the instructions for the user to hold the bank up to the ATM comprises:
   displaying a first instruction to hold the first side of the bank card up to the ATM; and
   displaying a second instruction to hold the second side of the bank card up to the ATM.

4. The method of claim 1 wherein reading card information from the bank card comprises applying optical character recognition (OCR) to the one or more images of the bank card.

5. The method of claim 1 comprising:
   capturing, by a second camera at an ATM, one or more images of the user; and
   storing the one or more images of the user to a storage device attached to the ATM.

6. The method of claim 1 wherein the PIN is a one-time PIN assigned to the user for a single transaction.

7. The method of claim 1 wherein reading card information from the bank card by processing the one or more images of the bank card comprises:
   verifying the bank card is valid by comparing the one or more images of the bank card to images of known valid bank cards issued by one or more card providers.

8. The method of claim 7 wherein sending the request further comprising sending the one or more images to the server device; and
   the method further comprises comparing, by the server device, the one or more images of the bank card to the images of known valid bank cards issued by one or more card providers.

9. A secure automated teller machine (ATM) comprising:
   a first camera;
   a display device;
   an input device;
   a processor; and
   a non-volatile memory storing instructions that when executed on the processor cause the processor to:
      display, on the display device, instructions for a user to hold a bank card in view of the first camera;
      capture, by the first camera, one or more images of the bank card, the one or more images comprising a first side of the bank card and a second side of the bank card;
      read card information from the bank card by processing the one or more images of the bank card, wherein the card information comprises an account number and an expiration date;
      receive, from the input device, a personal identification number (PIN) entered by the user;
      access a transaction history associated with the bank card;
      identify visible wear indicators on the first side of the bank card and the second side of the bank card based on the one or more images;
      compare the identified visible wear indicators to expected wear indicators based on the transaction history;
      confirm that the bank card is not counterfeit by determining that the identified visible wear indicators are consistent with the expected wear indicators based on comparison;
      based on the confirming, send a request to a server device to verify the card information and the PIN; and
      in response to receiving a response from the server device, conduct a transaction with the user.

* * * * *